United States Patent
Ewertz

(10) Patent No.: US 6,718,461 B1
(45) Date of Patent: Apr. 6, 2004

(54) BOOTING PROCESSOR-BASED SYSTEMS

(75) Inventor: James H. Ewertz, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/560,454

(22) Filed: Apr. 28, 2000

(51) Int. Cl.[7] .......................... G06F 15/177; G06F 3/00
(52) U.S. Cl. .................. 713/1; 713/2; 710/10
(58) Field of Search .................. 713/401, 2, 200, 713/1; 710/10, 104

(56) References Cited

U.S. PATENT DOCUMENTS

| | | | | |
|---|---|---|---|---|
| 5,568,611 A | * | 10/1996 | Khatri et al. | ............... 713/200 |
| 5,634,137 A | * | 5/1997 | Merkin et al. | ............... 710/10 |
| 5,978,113 A | * | 11/1999 | Kight | ............... 398/1 |
| 6,092,135 A | * | 7/2000 | Kwon | ............... 710/104 |
| 6,272,628 B1 | * | 8/2001 | Aguilar et al. | ............... 713/2 |
| 6,434,697 B1 | * | 8/2002 | Leyda et al. | ............... 713/2 |

FOREIGN PATENT DOCUMENTS

EP           892334 A2  *  1/1999   ............. G06F/1/00

OTHER PUBLICATIONS

Edward Griffin, PC Security, Nov. 24, 1996, Newsgroups: ns.general, p. 1.*

* cited by examiner

*Primary Examiner*—Dennis M. Butler
*Assistant Examiner*—Suresh K Suryawanshi
(74) *Attorney, Agent, or Firm*—Trop, Pruner & Hu, P.C.

(57) ABSTRACT

A processor-based system may selectively undergo one of two power on self test routines. The determination as to whether to undergo the full power on self routine or an abbreviated routine is based on whether or not the user has opened the chassis of the computer system. If the chassis has not been opened, one may assume the components of the system have not been altered and an abbreviated post is used because all the components need not be testing during the boot process.

15 Claims, 3 Drawing Sheets

BOOTING PROCESSOR-BASED SYSTEMS

BACKGROUND

This invention relates generally to booting processor-based systems.

For a typical computer system, the "boot" process is executed by a program usually located in read-only memory (ROM) of the computer system. The ROM program may be described as including two separate processes: the power-on self test or POST, and the basic input/output system, or BIOS. The POST part of the program executes commands such that different circuitry and components of the computer system may be initialized. The BIOS portion includes functions which may be used by software, including POST, for communicating with different devices in the computer system.

Upon receiving power to the computer system, the POST program in the ROM immediately begins execution. The POST performs initialization functions, such as detecting and testing the memory, the display, the non-volatile media, such as hard disk and floppy disk drives, and so on. In some systems, an abbreviated POST or "quick-boot", may be available.

Once the POST routine completes initialization and testing of the system, control is typically transferred to an operating system, usually located on the hard disk drive. Once the operating system gains control of the system, all run time operations of the system, including any execution of application programs, are controlled by the operating system. The operating system may or may not utilize the BIOS functions in communicating with the hardware of the computer system.

The computer industry is looking for ways to make the boot process faster. One reason for shortening the boot process is that many users of computer systems expect appliance-like functionality. They are impatient with long boot times and other procedures that are not commonly associated with the operation of appliances.

Thus, there is a continuing need for ways to reduce the time of the boot process.

DETAILED DESCRIPTION

In accordance with embodiments of the present invention, a system may selectively undergo one of two power on self test (POST) routines. The determination as to whether to undergo the full POST routine or an abbreviated POST routine is based on whether or not the user has opened the chassis of the computer system. If the chassis has not been opened, one may assume the components of the system have not been altered, and an abbreviated POST is used because all of the components need not be tested during the boot process. By using a chassis intrusion detection sensor, the system may automatically determine, during the boot process, whether the chassis has been opened. If not, the abbreviated post routine may be used. If the chassis has been opened, the full post routine may be undertaken.

Figure 1:
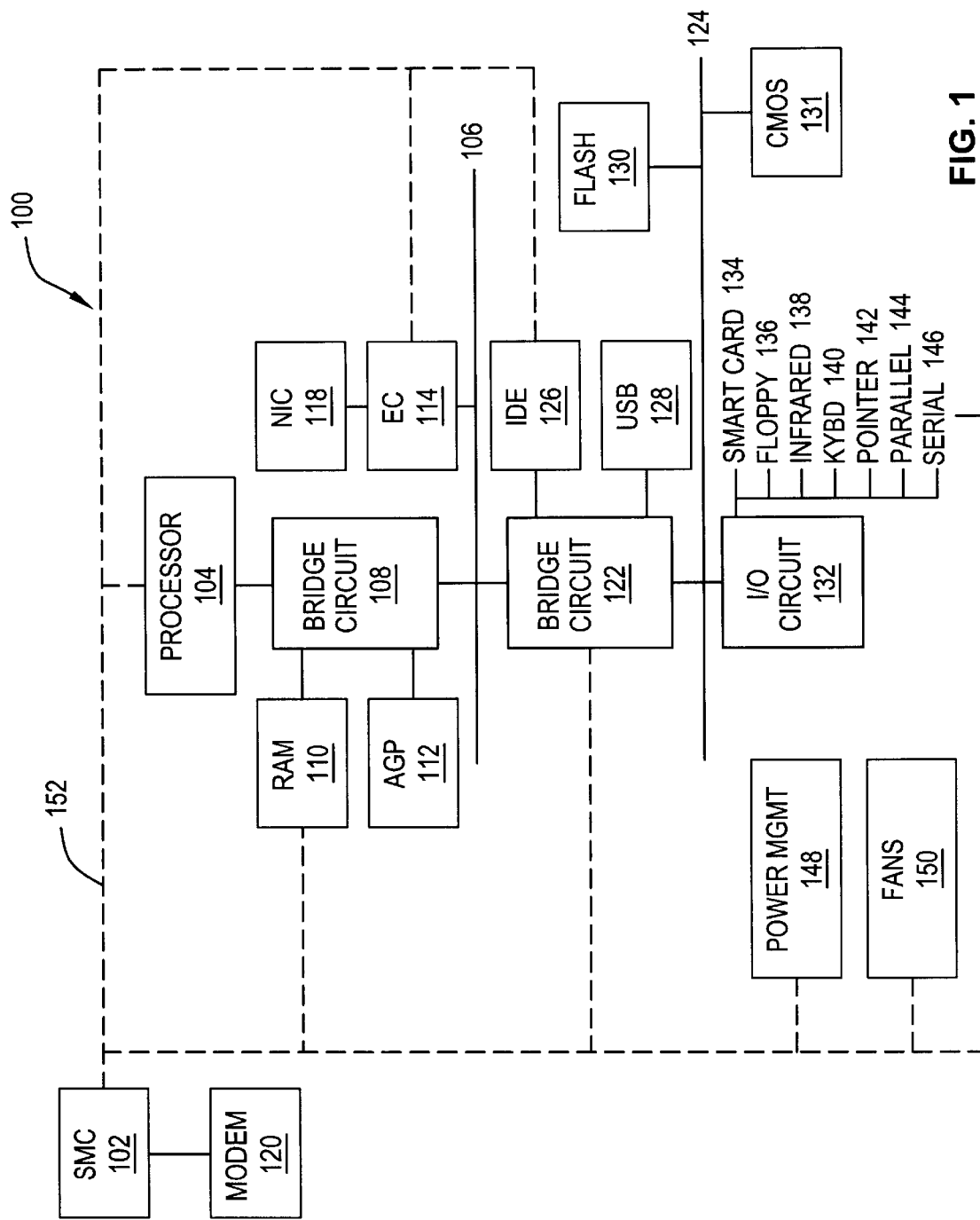
FIG. 1 shows a computer system incorporating a system management controller in accordance with one embodiment of the invention.

Referring to FIG. 1, an illustrative processor-based system 100 has a system management controller (SMC) 102. The computer system 100 includes a host processor 104 coupled to a system bus 106 through a bridge circuit 108. Illustrative host processors 104 include the PENTIUM® family of processors from Intel Corporation of Santa Clara, Calif. One illustrative bridge circuit 108 is the 82443LX PCI-to-AGP controller manufactured by Intel Corporation. The bridge circuit 108 provides an interface to couple system random access memory (RAM) 110 and accelerated graphics port (AGP) 112 devices. Also coupled to system bus 106 is Ethernet controller (EC) 114. The EC 114 may provide the processor 104 with an interface to a network interface card (NIC) 118. An illustrative EC-114 is the 82558 or 82559 device manufactured by Intel Corporation.

The bridge circuit 122 couples the system bus 106 to a secondary bus 124, while also providing integrated device electronics (IDE) 126 and universal serial bus (USB) 128 interfaces. Common IDE devices include magnetic and optical disk drives. One illustrative bridge circuit 122 is the 82371AB PCI-to-ISA/IDE controller made by Intel Corporation. Also coupled to secondary bus 124 are flash memory 130, a CMOS memory/real time clock 131 and input-output (I/O) circuit 132. The memory 130 may store basic input-output system (BIOS) instructions for the computer system 100. The input-output circuit 132 may provide smart card interface 134 (see the "Interoperability Specification for Integrated Circuit Cards and Personal Computer Systems," Rev. 1.0, December 1997), floppy disk interface 136, infra-red ports 138, keyboard interface 140, pointer device ports 142, and parallel 144 and serial 146 ports. One illustrative I/O circuit is the SMC667 manufactured by Standard Microsystems Corporation of Hauppauge, N.Y.

In some computer systems, sensors (not shown) to monitor thermal conditions and/or power consumption within computer system 100 are coupled to a power management device 148. The power management device 148 may also be coupled to elements within computer system 100 such as the processor 104, NIC 118, and fans 150. Illustrative power management devices include the LM78 and LM79 devices from National Semiconductor Corporation and the ADM9240 device from Analog Devices Corporation.

The system management controller 102 may be coupled to various elements in computer system 100 via bus 152. For example, SMC 102 may be coupled to the processor 104, RAM 110, EC 114, bridge circuit 122, IDE devices via IDE port 126, memory 130 (via bridge circuit 122), power management device 148 and fans 150 via bus 152. The bus 152 may be, for example, a system management bus (SMBUs) as specified by Intel Corporation ("System Management Bus Specification," Rev. 1.0, 1995), an inter-integrated circuit control bus ($I^2C$)bus as specified by Phillips Semiconductors ("$I^2C$ Bus Specification," 1995), a parallel connection, or a combination of two or more of these types of interconnections. In addition, the SMC 102 may be coupled to modem 120 via an industry standard architecture (ISA) bus interface or, alternatively, modem 120 may be a system bus compatible modem (such as a PCI bus modem), coupled to computer system 100 via bus 106 and SMC 102 via bus 152. In another embodiment, the SMC and modem 120 are coupled to communicate through secondary bus 124.

Figure 2:
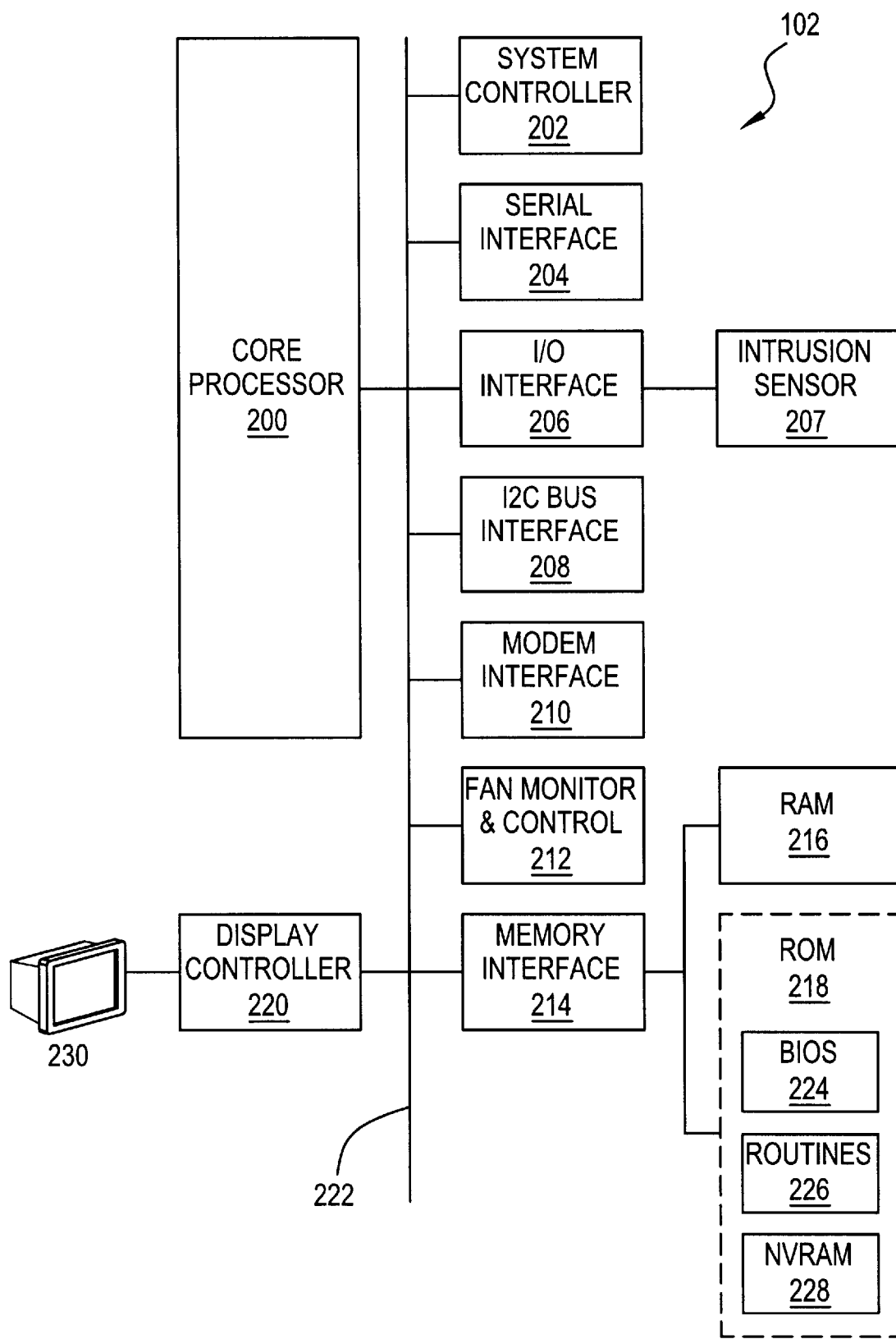
FIG. 2 shows a computer system start-up method in accordance with one embodiment of the invention.

Referring to FIG. 2, the SMC 102 may itself be a processor-based system that includes core processor 200, system controller 202, serial interface 204, I/O interface 206, I²C bus interface 208, modem interface 210, fan monitor and control circuit 212, memory interface 214, RAM 216, ROM 218, and display controller 220 coupled through local bus 222. The SMC 102 may be implemented by the Heceta II application specific integrated circuit (ASIC) available from Intel Corporation.

In one embodiment of the invention, the core processor 200 is a 80386 processor manufactured by Intel Corporation and the bus 222 is compatible with the 80386 bus interface standard. System controller 202 may provide, for example, bus arbitration and control, core processor 200 interrupt control, and SMC timer functionality. Serial interface 204 may provide, for example, connectivity to serial port 146 (see FIG. 1) through a programmable baud rate port such as a programmable RS-232 port.

The I/O interface 206 may provide general purpose input-output (GPIO) capability including sensor input (e.g., thermal sensors and a system 100 chassis intrusion sensor 207) and device control signal output. A chassis intrusion sensor may be an optical sensor that determines when the chassis has been opened. One such chassis intrusion included sensor is the LM 78/79 from National Semiconductor Corporation. I²C interface 208 may provide connectivity to computer system 100 elements such as processor 104, EC 114, RAM 110, bridge circuit 122, and IDE port 126 devices as shown in FIG. 1.

The modem interface 210 may provide electrical coupling to modem 120 through a standard ISA bus interface (e.g., 8 data bits, 16 address bits, and 4 control bits). The fan monitor and control circuit 212 may provide the capability to determine fan 150 speed and to generate fan speed control signals (e.g., pulse width modulated signals). The memory interface 214 may provide access to RAM 216 and ROM 218 through, for example, the MICROWIRE® bus interface as described by National Semiconductor Corporation. In one embodiment, ROM 218 is internal to SMC 102 while, in another embodiment, ROM 218 is external to SMC 102. ROM 218 may include BIOS instructions 224 for the core processor 200, operating routines 226 to instruct the core processor 200 how to process input signals from and transmit output signals to various computer system 100 elements, and nonvolatile random access memory (NVRAM) 228 for SMC operational data such as an Internet address of the system 100. The display controller 220 may provide, for example, video memory and control circuitry to drive video display 230. Display 230 may be used in some embodiments so that a user may view what operations (and their results) SMC 200 is performing.

Referring again to FIG. 2, operating routines 226 may comprise a plurality of software program modules to: communicate with serial port 146 through serial interface 204; process input signals from, and generate output signals to, devices coupled to I/O interface 206; determine and modify the state of processor 104, system RAM 110, EC 114, bridge circuit 122, devices coupled to IDE port 126, and memory 130 through I²C interface 208; communicate with modem 120 through modem interface 210; monitor and control fans 150 through fan monitor and control circuit 212; and read from and write to the BIOS 224, program routines 226, and NVRAM 228 portions of ROM 222.

Communication programs (in either BIOS 224 and/or routines 224 may, for example, allow SMC 102 to receive and transmit data via NIC 118 and modem 120 independent of host processor 104. (Known communication protocols such as the transport control protocol (TCP), the internet-work packet exchange (IPX) protocol, and the network basic input-output system extended user interface (NETBEUI) protocol may be used.) One significant benefit of this capability is that a remote entity (e.g., a technician helping a user troubleshoot their computer system, or a computer system security manager) may contact and query computer system 100 to determine its state—thus providing accurate and detailed state information about computer system 100. Thus, the SMC 102 may regulate the behavior of the system 100 by determining and modifying the state of various system components (e.g., processor 104 state).

When enabled, event routines 226 may allow SMC 102 to handle specified events such as when the temperature of computer system 100 exceeds a preset thermal limit (e.g., indicated via sensor input received through I/O interface 206 or fan monitor and control circuit 212), or when processor 104 fails to boot properly or ceases to execute user program instructions, or when computer system 100's enclosure is opened (e.g., indicated via sensor input received through I/O interface 206), or when computer system 100's power supply—voltage and/or current—fall outside specified limits (e.g., indicated via sensor input received through I/O interface 206).

Figure 3:
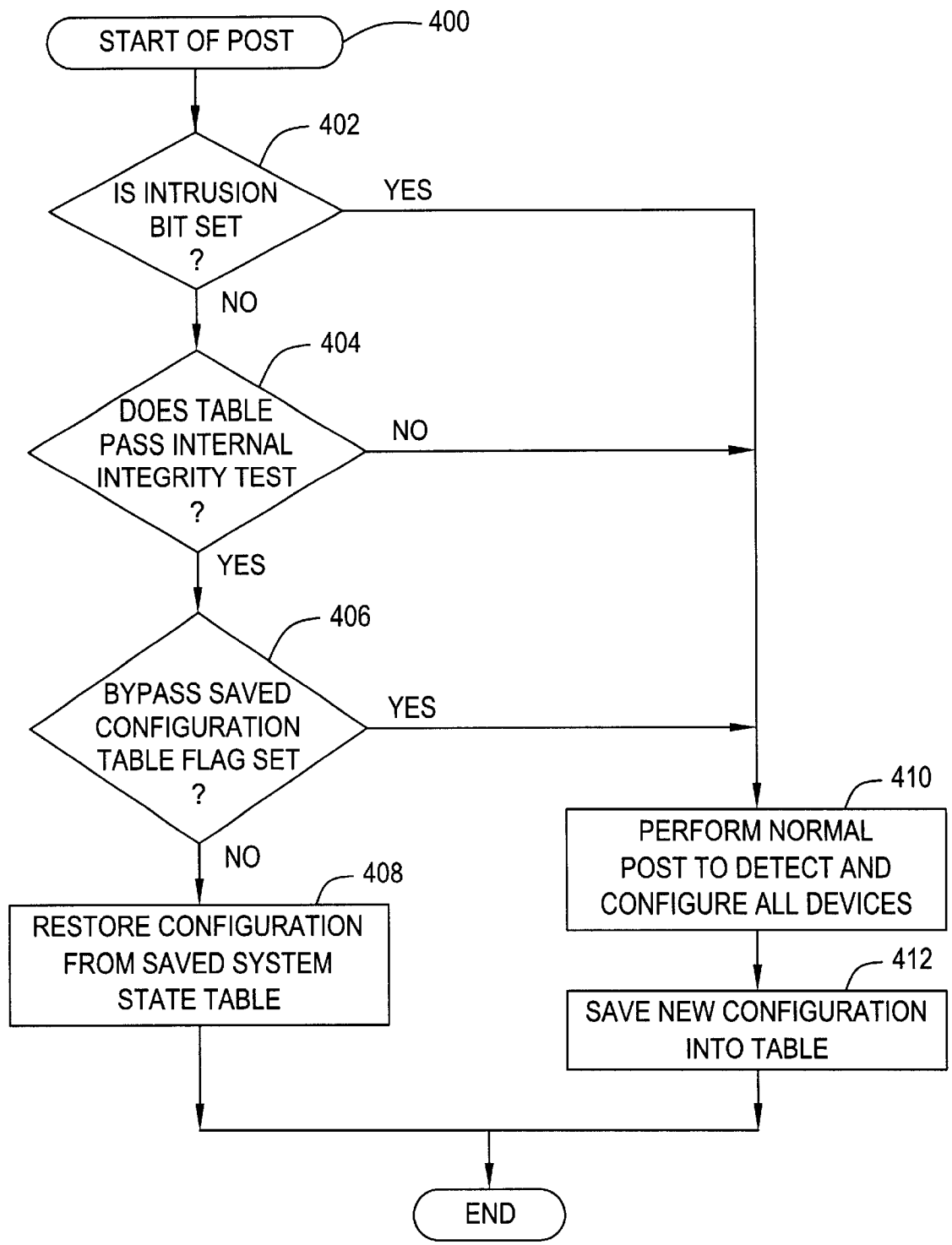
FIG. 3 shows a computer system enclosure security method in accordance with one embodiment of the invention.

Referring to FIG. 3, the software 400, in accordance with one embodiment of the present invention, determines whether or not to undergo an abbreviated or full POST. The abbreviated POST results in a faster boot process which is generally preferred by most users. By detecting a chassis intrusion event, the system can determine whether or not the full boot is needed. The full boot process may involve a POST routine that may check a variety of system configuration settings. For example, the configuration settings that may be checked include memory configurations, hard disk drives and timing modes, boot device, legacy device configuration including input/output, interrupts and direct memory access, peripheral component interconnect devices such as input and output devices, interrupt devices and memory, and on-board device enable/disable based on setup and/or external devices. If the intrusion event is not active, then the BIOS POST can skip the detection portions of the POST and retrieve information from tables in non-volatile memory or other non-volatile storage.

At diamond 402, a check determines whether the intrusion bit is set. The bit, which may be stored in the CMOS memory 131, is set when a chassis intrusion is detected. The intrusion bit is generated as a result of a signal from the interface 206 which is coupled to the chassis intrusion sensor. If the bit is not set, a check at diamond 404 determines whether or not a saved system state table passes an internal integrity test. The table stores the last good configuration settings of the system. These settings may be utilized to quickly reestablish the system in its last good state. If so, a check a diamond 406 determines whether a "bypass the saved system state table" flag is set. If not, the system may be booted from a stored configuration from the saved system state table.

If the check at diamonds 402 or 406 provides a 'yes' indication or if the check at diamond 404 provides a 'no' indication, a normal POST may be undertaken to detect and configure all system components as indicated in block 410. The new configuration of the system 100, as determined from undergoing the full POST routine, may then be saved into a table which may be stored in non-volatile memory such as the flash memory 130 shown in FIG. 1. In this way, the next time the system 100 boots, if the intrusion bit indicates that the chassis has not been opened, the system 100 may be quickly restored from the saved system state table.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   determining whether a computer chassis has been opened;
   controlling a boot process based on whether or not the chassis has been opened;
   using a shorter power on self test routine when the chassis has not been opened;
   using a saved system state configuration to boot the system when the chassis has not been opened; and
   checking the integrity of said saved system state configuration before booting using said saved system state configuration.

2. The method of claim 1 wherein determining whether the chassis has been opened includes checking a chassis intrusion sensor.

3. The method of claim 1 including booting using a longer power on self test routine when the chassis has been opened and a shorter power on self test routine when the chassis has not been opened and storing the system state configuration after booting from the longer power on self test routine.

4. The method of claim 1 including setting a chassis intrusion bit based on whether or not said chassis has been opened.

5. The method of claim 4 including storing said intrusion bit in CMOS memory.

6. The method of claim 1 including initiating a faster boot sequence when it is determined that the chassis has not been opened.

7. An article comprising a medium that stores instructions that, if executed, enable a processor-based system to:
   determine whether a computer chassis has been opened;
   control a boot process based on whether or not the chassis has been opened;
   use a shorter power on self test when the chassis has not been opened;
   use a longer power on self test routine when the chassis has been opened;
   booting using a saved system state configuration when the chassis has not been opened; and
   check the integrity of the saved system state configuration before booting using said configuration.

8. The article of claim 7 further storing instructions that cause a processor-based system to check a chassis intrusion sensor to determine whether a computer chassis has been opened.

9. The article of claim 7 further storing instructions that cause a processor-based system to boot using a longer power on self test routine when the chassis has been opened and a shorter power on self test routine when the chassis has not been opened and store a system state configuration after booting using the longer power on self test routine.

10. The article of claim 7 further storing instructions that cause a processor-based system to set a chassis intrusion bit based on whether or not said chassis has been opened.

11. The article of claim 10 further storing instructions that cause a processor-based system to store said intrusion bit in CMOS memory.

12. The article of claim 7 further storing instructions that cause a processor-based system to initiate a faster boot sequence when the chassis has not been opened.

13. A system comprising:
   a processor;
   a storage coupled to said processor;
   an interface coupled to said processor, said interface coupled to a chassis intrusion sensor; and
   software stored on said storage to control the boot process for said system based on whether or not the chassis has been opened, said software implementing a longer power on self test when the chassis has been opened and a shorter power on self test when the chassis has not been opened, said storage to store a table that includes information about a saved system state configuration, wherein said system boots from said saved system state configuration when the chassis has not been opened since the last boot operation, and said software to check the integrity of said saved system state configuration before booting using said saved system state configuration.

14. The system of claim 13 said processor including a CMOS memory, said CMOS memory storing a bit which indicates whether or not said sensor has detected whether said chassis has been opened.

15. The system of claim 13 wherein if said system is booted using said longer power on self test routine, the software causes the system state configuration to be saved after completing said power on self test routine.

* * * * *

UNITED STATES PATENT AND TRADEMARK OFFICE
CERTIFICATE OF CORRECTION

PATENT NO. : 6,718,461 B1
DATED : April 6, 2004
INVENTOR(S) : James H. Ewertz

It is certified that error appears in the above-identified patent and that said Letters Patent is hereby corrected as shown below:

<u>Title page, Item [54], and Column 1, line 1,</u>
should read:
METHOD FOR CONTROLLING A BOOT PROCESS BASED ON WHETHER OR NOT A COMPUTER CHASIS HAS BEEN OPENED

Signed and Sealed this

Twenty-ninth Day of June, 2004

JON W. DUDAS
*Acting Director of the United States Patent and Trademark Office*